US012120698B2

(12) United States Patent
Chen et al.

(10) Patent No.: US 12,120,698 B2
(45) Date of Patent: Oct. 15, 2024

(54) METHOD AND DEVICE FOR DETECTING DOWNLINK CONTROL INFORMATION

(71) Applicant: GUANGDONG OPPO MOBILE TELECOMMUNICATIONS CORP., LTD., Dongguan (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 379 days.

(21) Appl. No.: 17/528,140

(22) Filed: Nov. 16, 2021

(65) Prior Publication Data

US 2022/0078772 A1     Mar. 10, 2022

Related U.S. Application Data

(63) Continuation of application No. PCT/CN2019/094941, filed on Jul. 5, 2019.

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 5/0048* (2013.01); *H04W 72/21* (2023.01)

(58) Field of Classification Search
CPC . H04W 72/23; H04W 72/21; H04W 72/0446; H04L 1/1812; H04L 5/0048;
(Continued)

(56) References Cited

U.S. PATENT DOCUMENTS

2018/0367283 A1   12/2018   Huang et al.
2019/0141693 A1   5/2019    Guo et al.
(Continued)

FOREIGN PATENT DOCUMENTS

CN        108206714 A      6/2018
CN        108633002 A      10/2018
(Continued)

OTHER PUBLICATIONS

International Search Report of PCT/CN2019/094941, mailed from China National Intellectual Property Administration on Apr. 2, 2020.

(Continued)

*Primary Examiner* — Afshawn M Towfighi
(74) *Attorney, Agent, or Firm* — Sheppard, Mullin, Richter & Hampton LLP

(57) ABSTRACT

Provided are a downlink signal transmission method and device, which can improve signal transmission performance. The method includes: a terminal device determines the number of bits of a target information indication field in the DCI and/or the information content indicated by the target information indication field according to the configuration of CORESET group index; the terminal device transmits or receives signals scheduled by the DCI based on the number of bits of the target information indication field and/or the information content indicated by the target information indication field.

12 Claims, 7 Drawing Sheets

(51) Int. Cl.
   *H04L 5/00*   (2006.01)
   *H04W 72/21*  (2023.01)

(58) Field of Classification Search
   CPC ... H04L 1/1861; H04L 1/0003; H04L 1/1822;
         H04L 5/0046; H04L 5/0055; H04L
         1/0031; H04L 5/0094; H04B 7/0695
   See application file for complete search history.

(56) References Cited

U.S. PATENT DOCUMENTS

| | | | | |
|---|---|---|---|---|
| 2020/0154466 | A1* | 5/2020 | John Wilson | H04L 5/0055 |
| 2020/0221432 | A1* | 7/2020 | Park | H04L 1/1896 |
| 2020/0351916 | A1* | 11/2020 | Khoshnevisan | H04W 72/1268 |
| 2022/0078772 | A1* | 3/2022 | Chen | H04L 1/1861 |

FOREIGN PATENT DOCUMENTS

| | | | |
|---|---|---|---|
| CN | 109565839 | A | 4/2019 |
| CN | 109587791 | A | 4/2019 |
| CN | 109802757 | A | 5/2019 |
| CN | 109845371 | A | 6/2019 |
| CN | 110035511 | A | 7/2019 |
| WO | WO 2018/228487 | A1 | 12/2018 |

OTHER PUBLICATIONS

Huawei, HiSilicon, "Enhancements on Multi-TRP/panel transmission," R1-1908066, 3GPP TSG RAN WG1 Meeting #98, Prague, Czech Republic, Aug. 26-30, 2019.
Oppo, "Enhancements on multi-TRP and multi-panel transmission," R1-1908351, 3GPP TSG RAN WG1 Meeting #98, Prague, Czech Republic, Aug. 26-30, 2019.
EP Examination Report of European Patent Application No. 19936711.1, dated Mar. 28, 2023.
Extended European Search Report of European Application No. 19936711, dated Apr. 22, 2022.
First Office Action issued in Chinese Application No. 202110855050.8, dated Apr. 13, 2022.
Huawei, HiSilicon, Summary of AI: 7.2.8.2 Enhancements on Multi-TRP/Panel Transmission, 3GPP TSG RAN WG1 Meeting #95, R1-1814002, Spokane, USA, Nov. 12-16, 2018.
Vivo, Further Discussion on Multi-TRP Transmission, 3GPP TSG RAN WG1 #96bis, R1-1905610, Xi'an, China, Apr. 8-12, 2019.
Huawei, HiSilicon, Enhancements on Multi-TRP/panel transmission, 3GPPTSG RAN WGI #97, R1-1906029, Reno, USA, May 13-171h, 2019.
Huawei, HiSilicon, Summary of AI: 7.2.8.2 Enhancements on Multi-TRP/Panel Transmission of Offline Discussion, 3GPP TSG RAN WGI Meeting #96bis, R1-190ABCD, Xi'an, China, Apr. 8-12, 2019.
Second Office Action issued in Chinese Application No. 202110855050.8, dated Jul. 12, 2022.

* cited by examiner

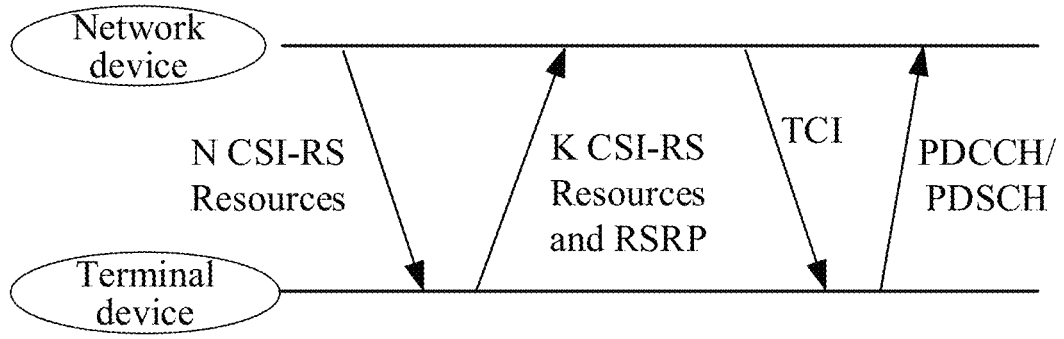

A terminal device determines a number of bits of a target information indication field and/or an information content indicated by the target information indication field in DCI according to configurations situations of CORESET group indexes — 610

The terminal device sends or receives signals scheduled by the DCI based on the number of bits of the target information indication field and/or the information content indicated by the target information indication field — 620

FIG. 6

METHOD AND DEVICE FOR DETECTING DOWNLINK CONTROL INFORMATION

CROSS-REFERENCE TO RELATED APPLICATIONS

The present application is a continuation application of International PCT Application No. PCT/CN2019/094941, having an international filing date of Jul. 5, 2019. The content of the above-identified application is hereby incorporated by reference.

TECHNICAL FIELD

Implementations of the present application relate to the field of communication, and more particularly, to a method and device for downlink signal transmission.

BACKGROUND

New radio (NR) systems support downlink and uplink incoherent transmission based on multiple transmission/reception points (TRPs). Data transmission from the multiple TRPs may be scheduled by a single piece of downlink control information (DCI), or may be scheduled by multiple pieces of DCI. In the two scheduling manners, information contents indicated by information indication fields, such as a DMRS port indication field or a TCI state indication field, included in a same DCI format, are different, and the lengths of the indication fields may also be different. Since a terminal device cannot know which scheduling manner a network device adopts, signals cannot be transmitted effectively based on the DCI.

SUMMARY

The present application provides a method and device for transmitting uplink signals, so as to improve signal transmission performance.

In a first aspect, a method for downlink signal transmission is provided, including: determining, by a terminal device, a number of bits of a target information indication field in downlink control information (DCI) and/or an information content indicated by the target information indication field according to configurations of Control Resource Set (CORESET) pool index; and sending or receiving, by the terminal device, signals scheduled by the DCI based on the number of bits of the target information indication field and/or the information content indicated by the target information indication field.

In a second aspect, a terminal device is provided, which may perform the method in the first aspect described above or any possible implementation thereof. Specifically, the terminal device includes function modules for performing the method in the first aspect described above or any possible implementation thereof.

In a third aspect, a terminal device is provided, including a processor and a memory. The memory is configured to store a computer program, and the processor is configured to call and run the computer program stored in the memory to perform the method in the first aspect described above or any possible implementation thereof.

In a fourth aspect, an apparatus for downlink signal transmission is provided, including a processor. The processor is configured to call and run a computer program from a memory, to enable a device disposed with the apparatus to perform the method in the first aspect described above or any possible implementation thereof.

Optionally, the apparatus is a chip.

In a fifth aspect, a computer readable storage medium is provided, configured to store a computer program, wherein the computer program enables a computer to perform the method in the first aspect described above or any possible implementation thereof.

In a sixth aspect, a computer program product is provided, including computer program instructions that enable a computer to perform the method in the first aspect described above or any possible implementation thereof.

In a seventh aspect, a computer program is provided, which, when run on a computer, enables the computer to perform the method in the first aspect described above or any possible implementation thereof.

Based on the above technical solution described above, a terminal device determines a number of bits of a target information indication field in DCI and/or information content indicated by the target information indication field according to a configuration of CORESET pool index, so that the DCI can be detected based on the number of bits of the target information indication field and/or the indicated information content and the signals can be transmitted accordingly based on the content indicated by the DCI, to improve signal transmission performance.

BRIEF DESCRIPTION OF DRAWINGS

FIG. 5 is a schematic diagram of a process of downlink beam management.

FIG. 6 is a schematic flow chart of a method for downlink signal transmission according to an implementation of the present application.

DETAILED DESCRIPTION

Technical solutions in implementations of the present application will be described below with reference to the accompanying drawings.

The technical solution of the implementations of the present application may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a Frequency Division Duplex (FDD) system, a Time Division Duplex (TDD) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a future 5G system or other communication systems, etc.

Generally speaking, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, etc., and the implementations of the present application may also be applied to these communication systems.

Optionally, a communication system in the implementations of the present application may be applied to a carrier aggregation (CA) scenario, a dual connectivity (DC) scenario, or a standalone (SA) network deployment scenario, etc.

Figure 1:
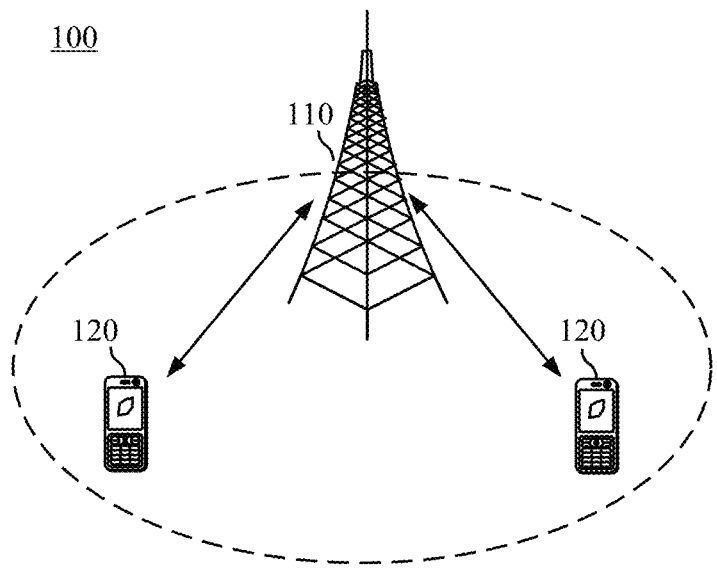
FIG. 1 is a schematic diagram of a possible wireless communication system according to an implementation of the present application.

Illustratively, a communication system 100 applied in an implementation of the present application is shown in FIG. 1. The communication system 100 may include a network device 110, which may be a device that communicates with a terminal device 120 (or referred to as a communication terminal, or a terminal). The network device 110 may provide communication coverage for a specific geographical area, and may communicate with terminal devices located within the coverage area.

Optionally, the network device 110 may be a base transceiver station (BTS) in a GSM system or CDMA system, a NodeB (NB) in a WCDMA system, an Evolutional Node B (eNB or eNodeB) in an LTE system, or a radio controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a future evolved public land mobile network (PLMN), etc.

The radio communication system 100 further includes at least one terminal device 120 located within the coverage area of the network device 110. The terminal device 120 may be mobile or fixed. Optionally, the terminal device 120 may refer to user equipment (UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN). Optionally, device to device (D2D) communication may be established between the terminal devices 120.

The network device 110 may provide services for a cell, and the terminal device 120 communicates with the network device 110 through transmission resources (e.g., frequency domain resources or spectrum resources) used by the cell. The cell may be a cell corresponding to the network device 110. The cell may be a macro base station, or a base station corresponding to a small cell. The small cell herein may include, for example, a Metro cell, a Micro cell, a Pico cell, a Femto cell, etc., which have characteristics such as small coverage range and low transmission power, and are suitable for providing high-speed data transmission services.

FIG. 1 illustrates exemplarily one network device and two terminal devices, but the present application is not limited thereto. The radio communication system 100 may include a plurality of network devices, and other numbers of terminal devices may be included within the coverage area of each network device. In addition, the radio communication system 100 may further include other network entities, such as a network controller and a mobile management entity.

Downlink and uplink incoherent transmission based on multiple TRPs are introduced in NR systems. Backhaul connections between the TRPs can be ideal or non-ideal. Information may be exchanged quickly and dynamically between the TRPs under the ideal backhaul, while information may be exchanged only quasi-statically between the TRPs under the non-ideal backhaul due to larger delays.

Figure 2A:
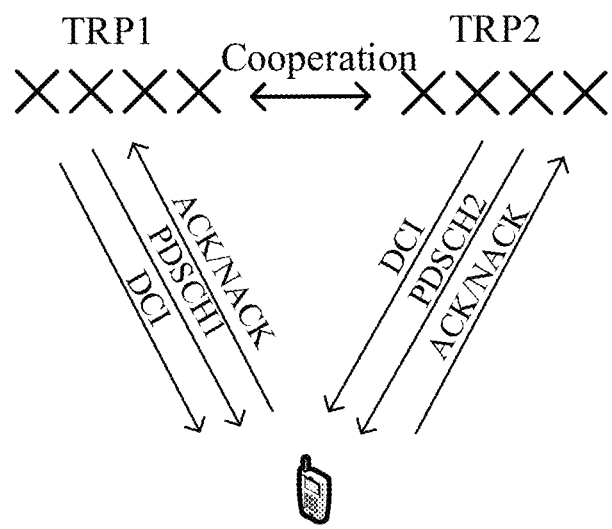
FIG. 2 A and FIG. 2 B are schematic diagrams of downlink incoherent transmission.
Figure 2B:
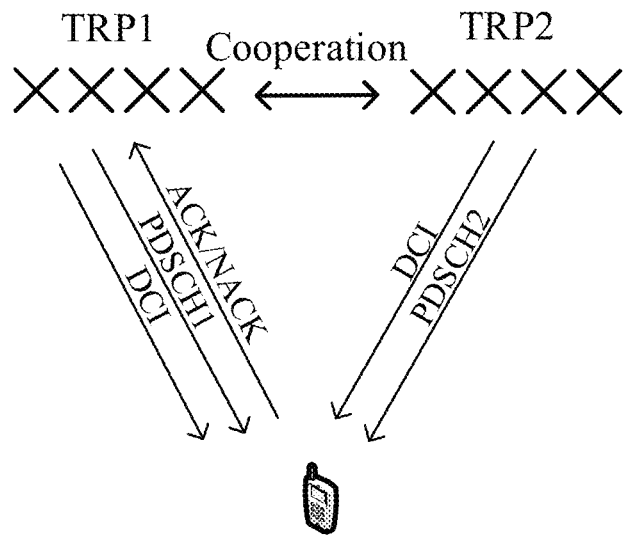

In the downlink incoherent transmission, multiple TRPs can schedule independently physical downlink shared channel (PDSCH) transmission of the terminal device using different control channels respectively, and the scheduled PDSCH can be transmitted in the same time slot or different time slots. The terminal device needs to support receiving physical downlink control channels (PDCCH) and PDSCHs from different TRPs simultaneously. When the terminal device feeds back an Acknowledgement/Negative acknowledgement (ACK/NACK), as shown in FIG. 2A, the ACK/NACK may be fed back to different TRPs transmitting the corresponding PDSCHs, or as shown in FIG. 2B, the ACK/NACK may be combined and reported to one TRP. The former can be applied to two scenarios which are the ideal backhaul and the non-ideal backhaul, while the latter can only be applied to the ideal backhaul scenario. DCI for scheduling the PDSCHs transmitted by different TRPs can be carried by different control resource sets (CORESETs), that is, multiple CORESETs are configured at a network side, and each TRP performs scheduling by using its own COREST, that is, different TRPs can be distinguished by the CORESETs.

Figure 3:
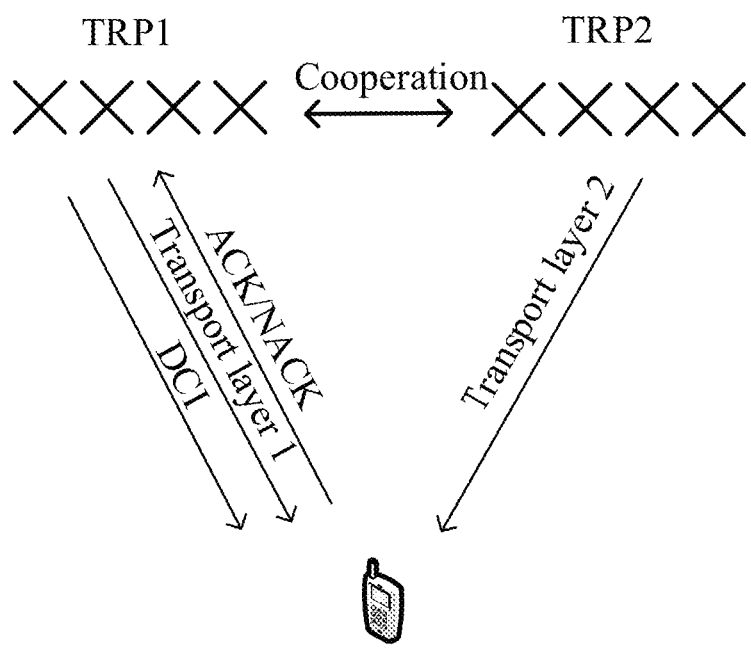
FIG. 3 is a schematic diagram of scheduling downlink transmission from multiple TRPs by a single PDCCH.

For the downlink transmission of multiple TRPs scheduled by a single PDCCH, as shown in FIG. 3, the same DCI may schedule multiple transport layers from different TRPs. The transport layers from different TRPs use demodulation reference signal (DMRS) ports in different code division multiplexing (CDM) groups and use different transmission configuration indicator (TCI) states. The network device needs to indicate the DMRS ports from different CDM groups and the TCI states corresponding respectively to different CDM groups, in one DCI, so as to support different DMRS ports which perform transmission using different beams. One CDM group contains one group of DMRS ports that multiplex the same time-frequency resources and different code sequences.

Figure 4A:
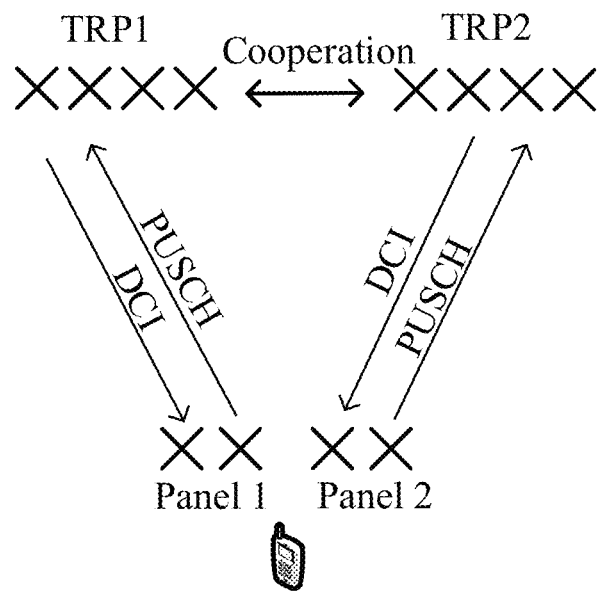
FIG. 4 A and FIG. 4 B are schematic diagrams of downlink incoherent transmission.
Figure 4B:
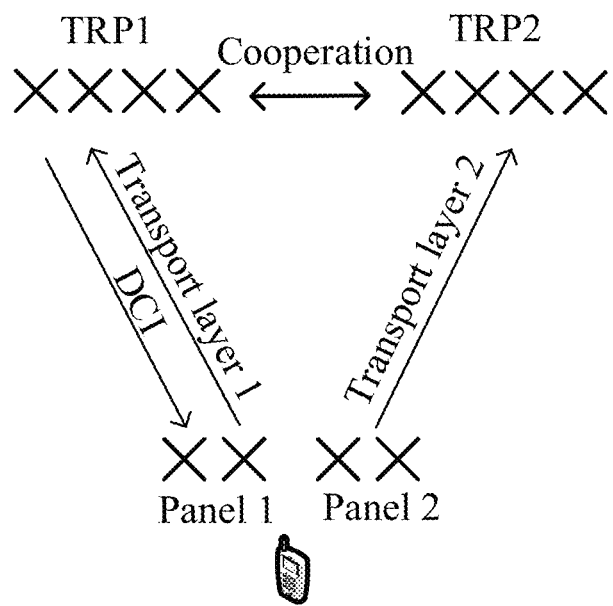

In the uplink incoherent transmission, different TRPs may further schedule physical uplink shared channel (PUSCH) transmission of the same terminal device independently. Independent transmission parameters, such as beam, precoding matrix, the number of layers, etc., may be configured for different PUSCH transmissions. The scheduled PUSCH transmission can be transmitted in the same time slot or different time slots. If the terminal device is scheduled with two PUSCH transmissions in the same time slot simultaneously, it needs to determine how to perform transmission according to its own capabilities. If the terminal device is configured with multiple antenna panels and supports simultaneous transmission of the PUSCHs on the multiple panels, the two PUSCHs may be transmitted at the same time, and the PUSCHs transmitted on different panels align with the corresponding TRPs for analog shaping, so that different PUSCHs may be distinguished by spatial domain to provide uplink spectral efficiency, as shown in FIG. 4A. If the terminal device has only a single panel or does not support simultaneous transmission on the the multiple panels, the PUSCHs can only be transmitted on one panel. The PUSCHs transmitted by different TRPs can be scheduled based on multiple pieces of DCI, which can be carried by different CORESETs, that is, multiple CORESETs are configured at the network side, and each TRP preforms the scheduling using its own CORESET. Similarly, the PUSCHs transmitted to different TRPs may be scheduled based on a single piece of DCI, at which point the DCI needs to indicate beams and DMRS ports used by the PUSCHs transmitted to different TRPs respectively, as shown in FIG. 4B.

Data transmission from multiple TRPs may be scheduled by a single piece of DCI, or may be scheduled by multiple pieces of DCI respectively. For the former, the DCI needs to indicate multiple DMRS port groups, that is, DMRS ports in multiple CDM groups and corresponding multiple TCI states. Transport layers of different TRPs use different DMRS port groups and different TCI states for transmission. For the latter, only one DMRS port group and one TCI state are indicated in each DCI. Since information contents indicated in information indication fields, such as a DMRS port indication field or a TCI state indication field, included in the same DCI format in the two scheduling modes, are different, and the lengths of the indication fields may also be different, the terminal device cannot determine what information is indicated by the information indication fields in the DCI, and thus cannot effectively transmit signals based on the DCI.

An implementation of the present invention proposes a method for downlink signal transmission, in which the number of bits of target information indication field in DCI and/or information content indicated by a target information indication field can be determined according to a configuration of CORESET pool index, such that, based on the number of bits of the target information indication field and/or the indicated information content, the DCI can be detected and corresponding signals can be transmitted, to improve a signal transmission performance.

In addition, in NR, a network device can use analog beams to transmit downlink PDSCHs. Before performing analog beam shaping, the network device needs to determine the used beams through a downlink beam management process, which may be performed based on channel state information-reference signal (CSI-RS) or synchronizing signal/PBCH block (SSB, SS block or SS/PBCH block). As shown in FIG. 5, the network device transmits multiple SSBs or CSI-RS resources for beam management, and a terminal device performs measurement based on these SSBs or CSI-RS resources, selects K SSBs or CSI-RS resources with a best reception quality from the SSBs or CSI-RS resources, and reports corresponding SSB indexes or CSI-RS resource indexes and corresponding reference signal receiving power (RSRP) to the network device. The network device obtains a best SSB or CSI-RS resource according to the report of the terminal device, and determines the transmission beam used by the network device as a transmission beam used for the downlink transmission, and thus used for transmitting downlink control channels or data channels. Before transmitting the downlink control channels or downlink data channels, the network device will indicate corresponding QCL (Quasi Co-location) reference signals to the terminal device through the TCI states, so that the terminal device may receive the corresponding downlink control channels or downlink data channels by using receiving beams used for receiving previously the QCL reference signals.

The network device can configure a corresponding TCI state for each downlink signal or downlink channel, and indicate a QCL reference signal corresponding to the downlink signal or downlink channel, so that the terminal device can perform a reception of the downlink signal or downlink channel based on the reference signal.

One TCI state can include the following configuration:
a TCI state identify (ID), used for identifying a TCI state;
QCL information 1; and
QCL information 2.

One piece of QCL information can include the following information:
QCL type configuration, which may be one of QCL type A, QCL type B, QCL type C and QCL type D; and
QCL reference signal configuration, including a cell identifier where a reference signal is located, a bandwidth part (BWP) identifier, and an identifier of the reference signal such as a CSI-RS resource identifier or an SSB index.
QCL type of at least one of QCL information 1 and QCL information 2 should be one of QCL type A, QCL type B and QCL type C. If another piece of QCL information is configured, its QCL type should be QCL type D.

Different QCL type configurations are defined as follows:
QCL-type A: {Doppler shift, Doppler spread, average delay, delay spread};
QCL-type B: {Doppler shift, Doppler spread};
QCL-type C: {Doppler shift, average delay};
QCL-type D: {Spatial Rx parameter)}.

If the network device configures the QCL reference signals of target downlink channels as reference SSBs or reference CSI-RS resources through the TCI states, and the QCL type configuration is QCL type A, QCL type B or QCL type C, then the terminal device may assume that the target downlink channels are the same as large-scale parameters of and the reference SSB or reference CSI-RS resources, and thus are received using the same corresponding receiving parameters. The large-scale parameters can be determined by the QCL type configuration. Similarly, if the network device configures the QCL reference signals of the target downlink channels as the reference SSB or reference CSI-RS resources through the TCI states, and the QCL type configuration is QCL type D, then the terminal device can receive the target downlink channels by using the same receiving beams used for receiving the reference SSBs or reference CSI-RS resources, that is, the same spatial receiving parameters. Generally, the target downlink channels and their reference SSBs or reference CSI-RS resources are transmitted by the same TRP, the same panel or the same beam. If transmission TRPs, transmission panels or transmission beams of two downlink signals or downlink channels are different, different TCI states will usually be configured.

For the downlink control channels, the TCI state can be indicated through radio resource control (RRC) signaling or RRC signaling+MAC signaling. For the downlink data channels, a set of available TCI states is indicated through the RRC signaling, and some of the TCI states are activated through medium access control (MAC) layer signaling. Finally, one or two of the TCI states are indicated from the activated TCI states through the TCI state indication fields in the DCI for transmission of the PDSCHs scheduled by the DCI. For example, the RRC signaling indicates N candidate TCI states, the MAC signaling further indicates K activated TCI states, and the DCI further indicates one or two of the K TCI states for transmission of the downlink data channels.

A method for transmitting a downlink signal according to an implementation of the present application will be described in detail below with reference to FIG. 6.

FIG. 6 is a schematic flow chart of a method for downlink signal transmission according to an implementation of the present application. The method 600 may be performed by a terminal device, which may be the terminal device 120 shown in FIG. 1. The method 600 may include part or all of the following contents.

In 610, the terminal device determines a number of bits of a target information indication field in downlink control information (DCI) and/or an information content indicated by the target information indication field according to configurations of Control Resource Set (CORESET) pool index.

In 620, the terminal device sends or receives signals scheduled by the DCI based on the number of bits of the target information indication field and/or the information content indicated by the target information indication field.

In the cases that one piece of DCI schedules data transmission of multiple TRPs and that one piece of DCI schedules data transmission of one TRP, information contents that need to be indicated by the target information indication fields in the DCI are different. When one piece of DCI schedules the data transmission of the multiple TRPs, since the transport layers of different TRPs use different DMRS port groups and different TCI states for the data transmission, the DCI needs to indicate multiple DMRS port groups and corresponding multiple TCI states; and when multiple pieces of DCI schedule the data transmission of the multiple TRPs respectively, each piece of DCI only schedules the data transmission of one TRP, and one piece of DCI only needs to indicate one DMRS port group and one TCI state. Since the terminal device cannot know which method a network device uses for scheduling, the terminal device is unable to distinguish the contents actually indicated in the current DCI.

In the implementation, the terminal device determines the number of bits of the target information indication field in the current DCI and/or the information content indicated by the target information indication field according to the configurations of the CORESET pool index, for example, whether the CORESET pool indexes are configured, the quantity of the configured CORESET pool indexes or values of the CORESET pool indexes, so that the DCI can be detected effectively and the signals can be transmitted based on the content indicated by the DCI, to improve signal transmission performance.

Optionally, the CORESET pool index may be configured by the network device. For example, each of the CORESET pool indexes is an index configured by the network device for each CORESET, which is included in a configuration parameter of each CORESET (also referred to as a CORESET parameter for short). The parameter may be an optional parameter, that is, a configuration parameter of a CORESET may or may not include the index.

The target information indication field includes at least one of:
a DMRS port indication field, used for indicating DMRS ports used by data transmission scheduled by the DCI or DMRS ports used by rate matching scheduled by the DCI, herein there is a mapping relationship between values of the DMRS port indication field and the DMRS ports, wherein a value of each of the DMRS port indication fields may correspond to one or more DMRS port groups, and each DMRS port group includes one or more DMRS ports;
a TCI indication field, used for indicating a QCL hypothesis used by data transmission scheduled by the DCI;
a Hybrid Automatic Repeat ReQuest (HARQ) process indication field, used for indicating a HARQ process used by data transmission scheduled by the DCI;
a second transport block information indication field, used for indicating transmission information of a second transport block (TB) in the DCI, such as modulation coding scheme (MCS), new data indicator (NDI), redundant version (RV), etc.;
a downlink assignment index (DAI) indication field, used for indicating an assignment index of the PDSCH scheduled by the DCI of multiple PDSCHs; and
a physical uplink control channel (PUCCH) resource indication field, used for indicating PUCCH resources used by HARQ-ACK of data transmission scheduled by the DCI.

In an implementation of the present application, the DCI may be DCI detected in any one of multiple CORESETs configured for the terminal device, that is, the terminal device jointly determines the number of bits of the target information indication field in the DCI and/or the information content indicated by the target information indication field detected in the multiple CORESETs according to the configurations of the CORESET pool indexes of the multiple CORESETs. The DCI may also be DCI detected in a first CORESET, that is, the terminal device determines the number of bits of the target information indication field and/or the information content indicated by the target information indication field in the DCI detected in the CORESET according to the configurations of the CORESET pool indexes of each of the CORESETs. These two cases will be described below respectively.

Case 1

For the DCI detected in any of the CORESETs, optionally, in 610, the terminal device may determine the number of bits of the target information indication field and/or the information content indicated by the target information indication field according to the quantity of the configured CORESET pool indexes.

The quantity is the total quantity of the configured different CORESET pool indexes. The quantity may be greater than 0 or equal to 0.

For example, a typical value of the quantity is 0, 1 or 2.

When the quantity is 0, it is indicated that the CORESET pool indexes are not configured, that is, the CORESET pool indexes are not included in the configuration information of all CORESETs; when the quantity is 1, it is indicated that the CORESET pool indexes configured for all CORESETs are the same, for example, values of the CORESET pool indexes (or referred to as index values) of all CORESETs are all 0 or all 1; when the quantity is 2, it is indicated that the CORESET pool indexes configured for a portion of the CORESETs are different from the CORESET pool indexes configured for another portion of the CORESETs. For example, multiple CORESETs are configured for the terminal device, where the CORESET pool indexes configured for a portion of the CORESETs are 0 and the CORESET pool indexes configured for another portion of the CORESETs are 1.

In the implementation, the terminal device may determine the number of bits of the target information indication field and/or the information content indicated by the target information indication field according to the quantity of the configured CORESET pool indexes. The number of bits of the target information indication field when the quantity is a first value may be different from the number of bits of the target information indication field when the quantity is a second value; and/or, the information content indicated by the target information indication field when the quantity is the first value is different from the information content indicated by the target information indication field when the quantity is the second value.

The target information indication field may be a DMRS port indication field, a TCI indication field, an HARQ process indication field, a second transport block information indication field, a DAI indication field, or a PUCCH resource indication field. The information contents indicated by the target information indication fields are different, and may include at least one of the following cases:

when the target information indication field includes the DMRS port indication field, a mapping relationship between values of the DMRS port indication field and DMRS ports when the quantity of the CORESET pool indexes is the first value is different from the mapping relationship when the quantity is the second value;

when the target information indication field includes the TCI indication field, TCI states corresponding to values of the TCI indication field when the quantity is the first value are different from the TCI states corresponding to the values of the TCI indication field when the quantity is the second value;

when the target information indication field includes the TCI indication field, the TCI indication field is only used for indicating one TCI state when the quantity is the first value, and the TCI indication field may be used for indicating one or more TCI states when the quantity is the second value;

when the target information indication field includes the HARQ process indication field, an HARQ process indicated by the HARQ process indication field when the quantity is the first value is different from the HARQ process indicated by the HARQ process indication field when the quantity is the second value;

when the target information indication field includes the second transport block information indication field, the second transport block information indication field may be used for indicating whether the second transport block is enabled or disabled when the quantity is the first value, and the second transport block information indication field only indicates that the second transport block is disabled when the quantity is the second value;

when the target information indication field includes the DAI indication field, an index indicated by the DAI indication field may be used for transmission of PDSCHs scheduled in multiple CORESETs when the quantity is the first value, and the index indicated by the DAI indication field is only used for transmission of the PDSCHs scheduled in a CORESET where the DCI is located when the quantity is the second value; and when the target information indication field includes the PUCCH resource indication field, the PUCCH resource indication field is used for indicating PUCCH resources in a first PUCCH resource set when the quantity is the first value, and the PUCCH resource indication field is used for indicating PUCCH resources in a second PUCCH resource set when the quantity is the second value.

Optionally, the first value may be 0, and the second value is greater than 0; or, the first value is 1, and the second value is 0 or 2; or, the first value is any one of 0, 1 and 2, and the second value is other one of 0, 1 and 2 than the first value.

In one implementation, the first value is 0, and the second value is 1 or 2.

When the quantity is 0, it is indicated that the CORESET pool indexes are not configured, at which point a single-TRP scenario is supported. When the quantity is 1 or 2, it is indicated that the CORESET pool indexes are configured, at which point a multiple-TRP scenario is supported.

For example, the number of bits of the target information indication field when the quantity of CORESET pool indexes is 0 is different from the number of bits of the target information indication field when the quantity is 1 or 2. The number of bits of the target information indication field is the same when the quantity is 1 and 2. For example, if the target information indication field includes the TCI indication field, the TCI indication field in the DCI is 3 bits when the quantity is 0 and the TCI indication field is 4 bits when the quantity is 1 and 2.

As another example, the content indicated by the target information indicating field when the quantity of CORESET pool indexes is 0 is different from the content indicated by the target information indicating field when the quantity is 1 or 2. When the quantity is 1 and 2, the content indicated by the target information indication field is the same. For example, taking the target information indication field including the HARQ process indication field as an example, the HARQ process indicated by the HARQ process indication field is one of HARQ processes 0-7 when the quantity is 0, and the HARQ process indicated by the HARQ process indication field is one of HARQ processes 0-15 when the quantity is 1 and 2.

In this implementation, data transmission in the single-TRP scenario and the multiple-TRP scenario may be implemented through the same DCI format, to improve flexibility of scheduling of data transmission. In the single-TRP scenario and the multiple-TRP scenario, the numbers of bits and/or the indicated information content of the target information indication fields in the DCI are different, and the terminal device may determine the lengths and contents of the target information indication fields in the current DCI according to whether the CORESET pool indexes are configured, so as to detect the DCI and transmit data based on the content indicated by the DCI.

In another implementation, the first value is 1, and the second value is 0 or 2.

When the quantity of CORESET pool indexes is 1, it is indicated that the CORESET pool indexes included in parameters of the CORESETs configured for the terminal device are the same, for example, they are all 0 or all 1, at which point a single piece of DCI schedules data transmission of multiple TRPs.

When the quantity is 0 or 2, one piece of DCI only schedules downlink transmission of one TRP. When the quantity is 0, it is indicated that the CORESET pool indexes are not configured, that is, the CORESET pool indexes are not included in the parameters of the CORESETs configured for the terminal device, at which point the single-TRP scenario is supported. When the quantity is 2, it is indicated that multiple CORESET pool indexes are configured, for example, the CORESET pool indexes included in the parameters of a portion of the CORESETs configured for the terminal device is 0, and the CORESET pool indexes included in the parameters of another portion of the CORESETs is 1, at which point the case where multiple pieces of DCI schedule downlink transmission of multiple TRPs respectively is supported.

For example, the number of bits of the target information indication field when the quantity of CORESET pool indexes is 1 is different from the number of bits of the target information indication field when the quantity is 0 or 2. When the quantity is 0 and 2, the number of bits of the target information indication field is the same. For example, if the target information indication field includes the TCI indication field, the TCI indication field is 4 bits when the quantity is 1, and the TCI indication field is 3 bits when the quantity is 0 and 2.

As another example, the number of bits of the target information indication field when the quantity of CORESET pool indexes is 1 is different from the number of bits of the target information indication field when the quantity of CORESET pool indexes is 2. For example, if the target information indication field includes the PUCCH resource indication field, the PUCCH resource indication field is 3 bits when the quantity is 1, and the PUCCH resource indication field is 4 bits when the quantity is 2.

As another example, the content indicated by the target information indicating field when the quantity of CORESET pool indexes is 1 is different from the content indicated by the target information indicating field when the quantity is 0 or 2. When the quantity is 0 and 2, the content indicated by the target information indication field is the same. For example, if the target information indication field includes the DMRS port indication field, a mapping relationship between values of the DMRS port indication field and DMRS ports indicated by the DMRS port indication field when the quantity is 1 is shown in Table 2, and the mapping relationship used when the quantity is 0 or 2 is shown in Table 1. It is assumed herein that a DMRS type is type 1, and the maximum number of DMRS symbols is 1.

TABLE 1

| Value of DMRS port indication field | Number of CDM groups without data transmission (DMRS port groups) | DMRS port |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0-2 |
| 12-15 | reserved | reserved |

TABLE 2

| Value of DMRS port indication field | Number of CDM groups without data transmission (DMRS port groups) | DMRS port |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0-2 |
| 12 | 2 | 1, 3 |
| 13 | 2 | 1-3 |
| 14-15 | reserved | reserved |

In this implementation, the cases that one piece of DCI schedules data transmission of one TRP and that one piece of DCI schedules data transmission of multiple TRPs may be implemented through the same DCI format, improving flexibility of scheduling of data transmission. When the DCI schedules data transmission of one TRP and schedules data transmission of multiple TRPs, the numbers of bits and/or the indicated information content of the target information indication fields in the DCI are different, and the terminal device may determine the lengths and contents of the target information indication fields in the current DCI according to the quantity of the configured CORESET pool indexes, so as to detect the DCI and transmit data based on the DCI.

In another implementation, the first value and the second value may be any two different values in 0, 1 and 2 respectively; or the first value is any one of 0, 1 and 2, and the second value is other two of 0, 1 and 2 than the first value.

Optionally, when the quantity is 0, 1 or 2, the numbers of bits of the target information indication fields are different from each other; and/or when the quantity is 0, 1 or 2, the contents indicated by the target information indication fields are different from each other.

When the quantity is 0, it is indicated that the CORESET pool indexes are not configured, that is, the CORESET pool indexes are not included in the parameters of the CORESETs configured for the terminal device, at which point the single-TRP scenario is supported.

When the quantity is 1, it is indicated that CORESET pool indexes included in parameters of the CORESETs configured for the terminal device are the same, for example, they are all 0 or all 1, at which point a single piece of DCI schedules data transmission of multiple TRPs.

When the quantity is 2, it is indicated that multiple CORESET pool indexes are configured, for example, the CORESET pool indexes included in the parameters of a portion of the CORESETs configured for the terminal device are 0, and the CORESET pool indexes included in the parameters of another portion of the CORESETs configured for the terminal device are 1, at which point the case that multiple pieces of DCE schedule downlink transmission of multiple TRPs respectively is supported.

Taking different target information indication fields as an example below, an implementation where the information content indicated by the target information indication field when the quantity is the first value is different from the information content indicated by the target information indication field when the quantity is the second value.

For example, the target information indication field includes a DMRS port indication field. A mapping relationship between values of the DMRS port indication field and DMRS ports when the quantity of CORESET pool indexes is the first value is different from the mapping relationship used when the quantity is the second value. The mapping relationship used when the quantity is the second value may include a mapping table used when the quantity is the first value. For example, the mapping relationship between the values of the DMRS port indication field and the DMRS ports when the quantity is 1 may be shown in Table 2, and the mapping relationship between the values of the DMRS port indication field and the DMRS ports when the quantity is 2 may be shown in Table 1. Optionally, the number of bits of the DMRS port indication field when the quantity is the first value may be different from the number of bits of the DMRS port indication field when the quantity is the second value. In this way, the same DMRS port indication field may support both the case that a single piece of DCI schedules data transmission of multiple TRPs and the case that multiple pieces of DCI schedule data transmission of multiple TRPs respectively.

As another example, the target information indication field includes a TCI indication field. Taking the first value being 2 and the second value being 0 or 1 as an example, TCI states corresponding to the TCI indication field when the quantity of CORESET pool indexes is 2 is different from TCI states corresponding to the TCI indication field when the quantity is 0 or 1. The TCI states corresponding to values of the TCI indication field can be preconfigured by the network device through an MAC layer signaling. Assuming that the TCI indication field includes 3 bits, which can indicate 8 different values, the MAC layer signaling may be preconfigured with 8 sets of TCI states, each set of TCI states corresponding to one value. One set of TCI states may include one or more TCI States. The eight sets of TCI states when the quantity is the first value and the eight sets of TCI states when the quantity is the second value may be configured independently through different MAC signaling.

Figure 7:
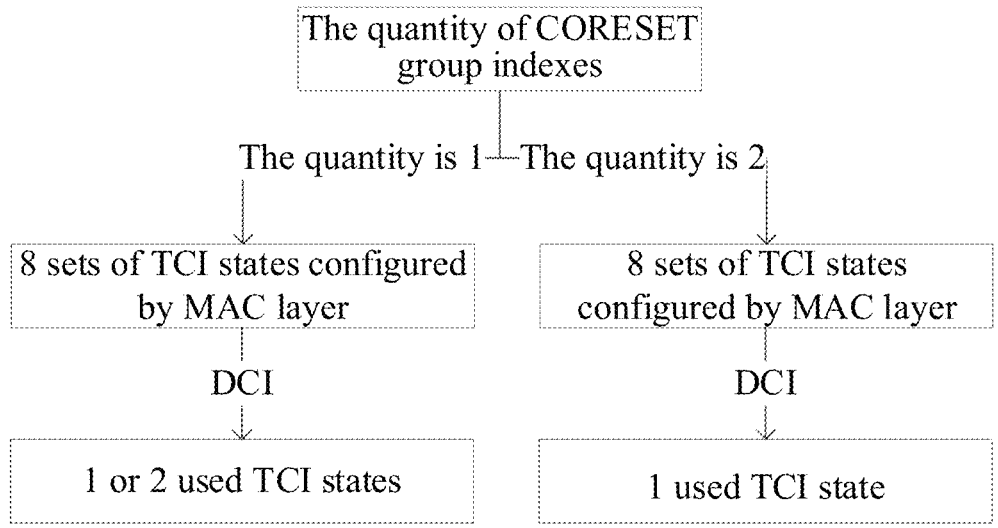
FIG. 7 is a schematic diagram of determining TCI states according to a quantity of CORESET pool indexes.

Optionally, the TCI indication field may indicate only one TCI state when the quantity of CORESET pool indexes is 2, and the TCI indication field may indicate one or more TCI states when the quantity of CORESET pool indexes is 0 or 1. For example, as shown in FIG. 7, when the quantity of CORESET pool indexes is 2, each set of TCI states in the TCI states configured through the MAC layer only includes one TCI state. When the quantity is 1, each set of TCI states in the TCI states configured through the MAC layer may include one or two TCI states. Optionally, the number of bits of the TCI indication field when the quantity is the first value may be different from the number of bits of the TCI indication field when the quantity is the second value, for example, the TCI indication field is 3 bits when the first value is 2 and the TCI indication field is 4 bits when the second value is 1. In this way, the same TCI indication field may support both the case that a single piece of DCI schedules data transmission of multiple TRPs (at which point the TCI indication field may indicate multiple TCI states) and the case that multiple pieces of DCI schedule data transmission from multiple TRPs (at which point the TCI indication field may only indicate one TCI state).

As another example, the target information indication field includes an HARQ process indication field. An information content indicated by the HARQ process indication field is one of HARQ processes 0-7 when the quantity of CORESET pool indexes is 0 or 1, and the information content indicated by the HARQ process indication field is one of HARQ processes 0-15 when the quantity of CORESET pool indexes is 2. Optionally, the number of bits of the TCI indication field when the quantity is the first value may be different from the number of bits of the TCI indication field when the quantity is the second value, for example, the TCI indication field is 3 bits when the first value is 0 or 1, and the TCI indication field is 4 bits when the second value is 2. In this way, the same HARQ process indication field may support both the case that a single piece of DCI schedules data transmission of multiple TRPs (at which point the indication field may indicate up to 8 processes) and the case that multiple pieces of DCI schedule data transmission of multiple TRPs respectively (at which point the indication field may indicate up to 16 processes).

As another example, the target information indication field includes a second transport block information indication field. Taking the first value being 0 or 1 and the second value being 2 as an example, when the quantity of CORESET pool indexes is 2, the second transport block information indication field only indicates that the second transport block is disabled, and the second transport block information indication field may indicate, through a combination of values of MCS and RV, that the second transport block is disabled, at which point the second transport block cannot be used for data transmission, and the terminal device can only transmit data with the network device using a single transport block, i.e., the first transport block. When the quantity of CORESET pool indexes is 0 or 1, the second transport block information indication field may be used for indicating whether the second transport block is disabled, at which point the second transport block information indication field may be used for indicating MCS, RV, NDI and the like of the second transport block. That is, when the quantity is 2, the second transport block information indication field only indicates that the second transport block is disabled, and when the quantity is 0 or 1, the second transport block information indication field may be used for indicating parameters of the second transport block. In this way, the same second transport block information indication field may support both the case that a single piece of DCI schedules data transmission of multiple TRPs (at which point the second transport block information indication field may indicate the parameters of the second transport block) and the case that multiple pieces of DCI schedule data transmission of multiple TRPs respectively (at which point the second transport block information indication field may only indicate that the second transport block is closed).

As another example, the target information indication field includes a DAI indication field. Taking the first value being 1 and the second value being 2 as an example, when the quantity of CORESET pool indexes is 1, an index indicated by the DAI indication field is used for transmission of PDSCHs scheduled in multiple CORESETs, and the index indicated by the DAI indication field needs to consider transmission of the PDSCHs scheduled in multiple CORESETs configured for the terminal device. When the quantity of CORESET pool indexes is 2, indexes indicated by the DAI indication field are only used for transmission of PDSCHs scheduled in CORESETs where the DCI is located, and the indexes indicated by DAI indication field only need to consider transmission of the PDSCHs scheduled in the CORESETs where the DCI is located.

Figure 8:
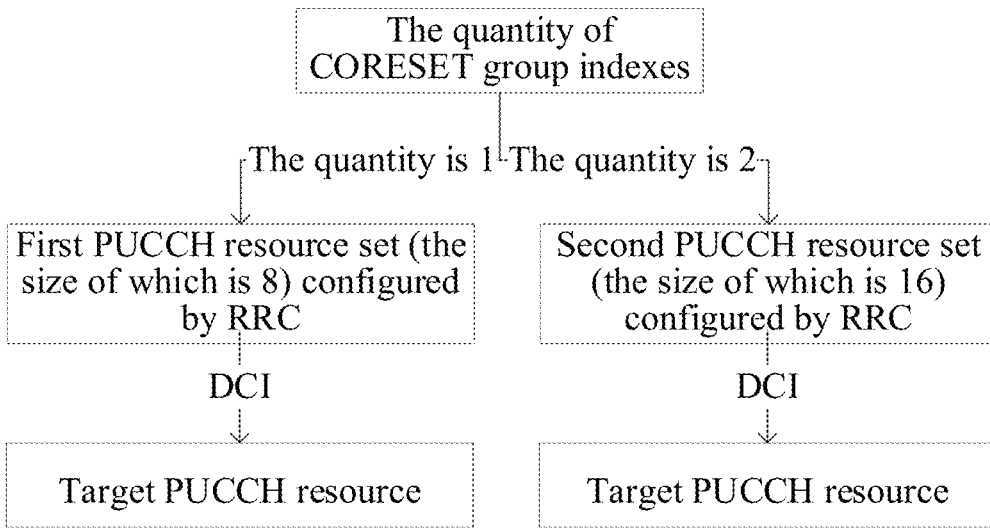
FIG. 8 is a schematic diagram of determining PUCCH resources according to a quantity of CORESET pool indexes.

As another example, the target information indication field includes a PUCCH resource indication field. Taking the first value being 1 and the second value being 2 as an example, when the quantity of CORESET pool indexes is 1, the PUCCH resource indication field is used for indicating PUCCH resources in a first PUCCH resource set. The PUCCH resource indication field is used for indicating PUCCH resources in a second PUCCH resource set when the quantity of CORESET pool indexes is 2. The network device may configure the two PUCCH resource sets in advance through a higher layer signaling, and the sizes of the two PUCCH resource sets may be the same or different. For example, as shown in FIG. 8, when the quantity is 1, the PUCCH resource indication field uses the first PUCCH resource set, and the terminal device selects a target PUCCH resource in the first PUCCH resource set; and when the quantity is 2, the PUCCH resource indication field uses the second PUCCH resource set, and the terminal device selects a target PUCCH resource in the second PUCCH resource set.

In this implementation, the same DCI format may support three scenarios: data transmission of a single TRP, a single piece of DCI scheduling data transmission of multiple TRPs, and multiple pieces of DCI scheduling data transmission of multiple TRPs respectively, which improves flexibility of scheduling of data transmission. When a piece of DCI schedules data transmission of one TRP and schedules data transmission of multiple TRPs, the numbers of bits and/or the indicated information contents of the target information indication fields in the DCI are different, and the terminal device may determine the lengths and contents of the target information indication fields in the current DCI according to the quantity of the configured CORESET pool indexes, thereby detecting the DCI and transmitting data based on the content indicated by the DCI.

Optionally, in 620, the terminal device may detect the DCI based on the number of bits of the target information indication field, and send or receive signals scheduled by the DCI according to the indicated information content in the detected DCI.

The terminal device may determine the length of bits of the DCI according to the number of bits of the target information indication field, so as to detect the DCI according to the length; or the terminal device determines an information content indicated by each information indication field in the DCI according to the number of bits of the target information indication field, and determines parameters of the signals scheduled by the DCI according to the information content indicated by each information indication field in the DCI, so as to send or receive the signals scheduled by the DCI based on the parameters.

Alternatively, the terminal device may determine the parameters of the signals scheduled by the DCI according to the information content indicated by the target information indication field, so as to send or receive the signals scheduled by the DCI based on the parameters.

Case 2

For the DCI detected in the first CORESET, optionally, in 610, the terminal device may determine the number of bits of the target information indication field in the DCI and/or the information content indicated by the target information indication field according to configurations of a CORESET pool index of the first CORESET.

In an implementation, in 610, the terminal device may determine the number of bits of the target information indication field and/or the information content indicated by the target information indication field according to whether the CORESET pool index is configured for the first CORESET.

In this implementation, the terminal device may determine the number of bits of the target information indication field and/or the information content indicated by the target information indication field according to whether the CORESET pool index is configured for the first CORESET.

The number of bits of the target information indication field when the CORESET pool index is configured for the first CORESET may be different from the number of bits of the target information indication field when the CORESET pool index is not configured for the first CORESET.

For example, the target information indication field includes a DMRS port indication field. The number of bits of the DMRS port indication field when the CORESET pool index is configured for the first CORESET is larger than the number of bits of the DMRS port indication field when the CORESET pool index is not configured for the first CORESET by 1.

As another example, the target information indication field includes an HARQ process indication field. The number of bits of the HARQ process indication field is 5 when the CORESET pool index is configured for the first CORESET, and the number of bits of the HARQ process indication field is 4 when the CORESET pool index is not configured for the first CORESET.

As another example, the target information indication field includes a PUCCH resource indication field. The number of bits of the PUCCH resource indication field is 4 when the CORESET pool index is configured for the first CORESET, and the number of bits of the PUCCH resource indication field is 3 when the CORESET pool index is not configured for the first CORESET.

In addition, the information content indicated by the target information indication field when the CORESET pool index is configured for the first CORESET may be different from the information content indicated by the target information indication field when the CORESET pool index is not configured for the first CORESET.

The target information indication field may be a DMRS port indication field, a TCI indication field, an HARQ process indication field, a second transport block information indication field, a DAI indication field or a PUCCH resource indication field. The information contents indicated by the target information indication fields are different, and may include at least one of the following cases:

the target information indication field includes the DMRS port indication field, and a mapping relationship between values of the DMRS port indication field and DMRS ports when the CORESET pool index is configured for the first CORESET is different from the mapping relationship when the CORESET pool index is not configured for the first CORESET;

the target information indication field includes the TCI indication field, and TCI states corresponding to values of the TCI indication field when the CORESET pool index is configured for the first CORESET are different from the TCI states corresponding to the values of the TCI indication field when the CORESET pool index is not configured for the first CORESET;

the target information indication field includes the second transport block information indication field, and the second transport block information indication field can only be used for indicating that the second transport block is disabled when the CORESET pool index is configured for the first CORESET, and the second transport block information indication field may be used for indicating whether the second transport block is enabled or disabled when the CORESET pool index is not configured for the first CORESET;

the target information indication field includes the DAI indication field, and an index indicated by the DAI indication field can only be used for downlink transmission of PDSCHs scheduled in the first CORESET when the CORESET pool index is configured for the first CORESET, and the index indicated by the DAI indication field is used for transmission of the PDSCHs scheduled in all multiple CORESETs when the CORESET pool index is not configured for the first CORESET; and the target information indication field includes the PUCCH resource indication field, and the PUCCH resource indication field is used for indicating PUCCH resources in a third PUCCH resource set when the CORESET pool index is configured for the first CORESET, and the PUCCH resource indication field is used for indicating PUCCH resources in a fourth PUCCH resource set when the CORESET pool index is not configured for the first CORESET.

For example, the target information indication field includes the DMRS port indication field, and the mapping relationship between the values of the DMRS port indication field and the DMRS port when the CORESET pool index is configured for the first CORESET is shown in Table 1 described above, and the mapping relationship used when the CORESET pool index is not configured for the first CORESET is shown in Table 2 described above.

As another example, the target information indication field includes the TCI indication field, and the TCI states corresponding to the values of the TCI indication field when the CORESET pool index is configured for the first CORESET are different from the TCI states corresponding to the values of the TCI indication field when the CORESET pool index is not configured for the first CORESET. The TCI states corresponding to different values of the TCI indication field may be preconfigured by the network device through an MAC layer signaling. Assuming that the TCI indication field includes signaling of 3 bits, which can indicate 8 different values. The MAC layer signaling may be preconfigured with 8 sets of TCI states, each set of TCI states corresponding to one value. The eight sets of TCI states when the CORESET pool index is configured for the first CORESET and the eight sets of TCI states when the CORESET pool index is not configured for the first CORESET may be configured independently through different MAC signalings.

As another example, the target information indication field includes the second transport block information indication field, and the second transport block information indication field may only indicates that the second transport block is disabled when the CORESET pool index is configured for the first CORESET, and the second transport block information indication field may be used for indicating whether the second transport block is enabled or disabled when the CORESET pool index is not configured for the first CORESET. When the CORESET pool index is configured for the first CORESET, the DCI in the first CORESET may only schedule the first transport block for data transmission, but the second transport block may not be used for data transmission, at which point the second transport block information indication field needs to indicate, through a combination of values of MCS and RV, that the second transport block is disabled. When the CORESET pool index is not configured for the first CORESET, the DCI in the first CORESET may schedule transmission of a single transport block or transmission of two transport blocks, that is, the second transport block information indication field may be used for indicating transmission parameters of the second transport block.

As another example, the target information indication field includes the DAI indication field, and an index indicated by the DAI indication field can only be used for transmission of the PDSCHs scheduled in the first CORESET when the CORESET pool index is configured for the first CORESET, and the index indicated by the DAI indication field is used for transmission of the PDSCHs scheduled in multiple CORESETs when the CORESET pool index is not configured for the first CORESET. When the CORESET pool index is not configured for the first CORESET, the index indicated by the DAI indication field in DCI detected in the first CORESET needs to consider transmission of the PDSCHs scheduled in multiple CORESETs. When the CORESET pool index is configured for the first CORESET, the index indicated by the DAI indication field in DCI detected in the first CORESET only needs to consider the transmission of the PDSCH scheduled in the first CORESET.

As another example, the target information indication field includes the PUCCH resource indication field, and the PUCCH resource indication field is used for indicating the PUCCH resources in the third PUCCH resource set when the CORESET pool index is configured for the first CORESET, and the PUCCH resource indication field is used for indicating the PUCCH resources in the fourth PUCCH resource set when the CORESET pool index is not configured for the first CORESET. The network device may configure the two PUCCH resource sets in advance through a higher layer signaling, which are applied respectively to the cases that the CORESET pool index is configured for the first CORESET and that the CORESET pool index is not configured for the first CORESET.

Therefore, when transmitting data using multiple TRPs, the network device may configure the CORESET pool index for the first CORESET; when transmitting data using a single TRP, the network device may not configure the CORESET pool index for the first CORESET. Thus, the same DCI format and information field may be used in both a single-TRP transmission scenario and a multiple-TRP transmission scenario to indicate different information contents, thereby improving flexibility of scheduling.

In another implementation, in 610, the terminal device may determine the number of bits of the target information indication field and/or the information content indicated by the target information indication field according to a value of the CORESET pool index of the first CORESET.

In this implementation, the terminal device may determine the number of bits of the target information indication field and/or the information content indicated by the target information indication field according to the value of the CORESET pool index configured for the first CORESET. For example, the number of bits of the target information indication field when the CORESET pool index of the first CORESET is a third value is different from the number of bits of the target information indication field when the CORESET pool index of the first CORESET is a fourth value; and/or the information content indicated by the target information indicating field when the CORESET pool index of the first CORESET is the third value is different from the information content indicated by the target information indicating field when the CORESET pool index of the first CORESET is the fourth value.

The target information indication field may be a DMRS port indication field, a TCI indication field, an HARQ process indication field, a second transport block information indication field, a DAI indication field or a PUCCH resource indication field. The information contents indicated by the target information indication fields are different, and may include at least one of the following cases:

the target information indication field includes the TCI indication field, and a mapping relationship between values of the TCI indication field and TCI states when the CORESET pool index of the first CORESET is the third value is different from the mapping relationship when the CORESET pool index of the first CORESET is the fourth value;

the target information indication field includes the HARQ process indication field, and a HARQ process indicated by the HARQ process indication field when the CORESET pool index of the first CORESET is the third value is different from a HARQ process indicated by the HARQ process indication field when the CORESET pool index of the first CORESET is the fourth value; and the target information indication field includes the PUCCH resource indication field, and the PUCCH resource indication field is used for indicating PUCCH resources in a fifth PUCCH resource set when the CORESET pool index of the first CORESET is the third value, and the PUCCH resource indication field is used for indicating PUCCH resources in a sixth PUCCH resource set when the CORESET pool index of the first CORESET is the fourth value.

Optionally, the third value may be 0, and the fourth value may be 1.

The target information indication field includes the TCI indication field, and a mapping relationship between values of the TCI indication field and TCI states when the CORESET pool index of the first CORESET is 0 is different from the mapping relationship used when the CORESET pool index of the first CORESET is 1.

Assuming that the TCI indication field includes signaling of 3 bits, which can indicate 8 different values. The MAC layer signaling may be preconfigured with 8 TCI states, each TCI state corresponding to one value. The eight TCI states configured when the CORESET pool index of the first CORESET is 0 and the eight TCI states configured when the CORESET pool index configured for the first CORESET is 1 can be configured independently through different MAC signaling.

Figure 9:
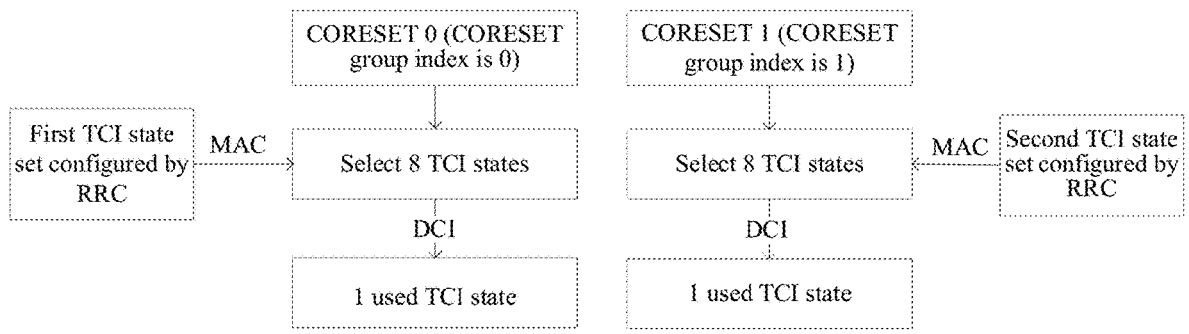
FIG. 9 is a schematic diagram of determining TCI states according to index values of CORESET pool indexes.

Alternatively, as shown in FIG. 9, assuming that the TCI indication field includes signaling of 3 bits, which can indicate 8 different values. The MAC layer signaling may select eight TCI states from a set of TCI states configured by RRC signaling in advance, each TCI state corresponding to one value. The set of TCI states configured when the CORESET pool index of the first CORESET is 0 may be different from the set of TCI states configured when the CORESET pool index of the first CORESET is 1, and these two sets of TCI states may be configured using independent RRC parameters.

As another example, the target information indication field includes the HARQ process indication field, and the HARQ process indicated by the HARQ process indication field when the CORESET pool index of the first CORESET is 0 is different from the HARQ process indicated by the HARQ process indication field when the CORESET pool index of the first CORESET is 1. For example, the HARQ process indicated by the HARQ process indication field is one of processes 0-7 when the CORESET pool index of the first CORESET is 0, and the HARQ process indicated by the HARQ process indication field is one of processes 8-15 when the CORESET pool index of the first CORESET is 1.

As another example, the target information indication field includes the PUCCH resource indication field, and the PUCCH resource indication field is used for indicating the PUCCH resources in the fifth PUCCH resource set when the CORESET pool index of the first CORESET is 0, and the PUCCH resource indication field is used for indicating the PUCCH resources in the sixth PUCCH resource set when the CORESET pool index of the first CORESET is 1. The fifth PUCCH resource set and the sixth PUCCH resource set may be pre-configured to the terminal device through a higher layer signaling.

Therefore, different CORESET pool indexes may correspond to different TRPs, and the same target information indication field in the DCI transmitted of different TRPs may be used for indicating different information contents, so that different TRPs have greater flexibility in scheduling data independently.

In this implementation, when the CORESET pool index of the first CORESET is the third value, the CORESET pool index of the first CORESET is the fourth value, and the CORESET pool index is not configured for the first CORESET, the numbers of bits of the target information indication fields may be different from each other, and/or the information contents indicated by the target information indication fields may be different from each other.

For example, when the CORESET pool index of the first CORESET is 0, the CORESET pool index configured for the first CORESET is 1, and the CORESET pool index is not configured for the first CORESET, the numbers of bits of target information indication fields in the DCI detected in the first CORESET are different from each other.

As another example, when the CORESET pool index of the first CORESET is 0, the CORESET pool index of the first CORESET is 1, and the CORESET pool index is not configured for the first CORESET, the information contents indicated by the target information indication fields in the DCI detected in the first CORESET are different from each other.

The number of bits of the target information indication field and the information content indicated by the target information indication field may be described in detail with reference with the description of Case 1 and Case 2, and will not be repeated herein for brevity.

Optionally, in 620, the terminal device detects the DCI based on the number of bits of the target information indication field, and sends or receives signals scheduled by the DCI according to the indicated information content in the detected DCI.

For each CORESET configured by the network device, the terminal device may determine the length of bits of the DCI in the CORESET according to the number of bits of the target information indication field, so as to detect the DCI according to the length; or the terminal device determines each information indication field in the DCI according to the number of bits of the target information indication field, and determines parameters of the signals scheduled by the DCI according to the information content indicated by each information indication field in the DCI, so as to send or receive the signals scheduled by the DCI based on the parameters.

Alternatively, for each CORESET configured by the network device, the terminal device determines the parameters of the signals scheduled by the DCI in the CORESET according to the information content indicated by the target information indication field, so as to send or receive the signals scheduled by the DCI based on the parameters.

In the implementation of the present application, a terminal device may determine whether the currently scheduled data transmission is single-TRP transmission or multiple-TRP transmission or whether data transmission between the terminal device and multiple TRPs is scheduled by a single piece of DCI or multiple pieces of DCI according to the total quantity of CORESET pool indexes currently configured by a network device or according to whether CORESET pool indexes are currently configured for CORESETs. On the one hand, the number of bits of the target information indication field in the DCI may be determined in view of the above, so that the DCI may be detected correctly; on the other hand, the configuration indicated by the value of the target information indication field in the DCI may be determined in view of the above, so that the data scheduled by the DCI can be sent or received correctly.

In addition, based on the implementation of the present application, both single-TRP transmission and multiple-TRP transmission may be supported, and multiple-TRP transmission scheduled by a single piece of DCI and multiple-TRP transmission scheduled by multiple pieces of DCI may be supported by using the same DCI format, thereby reducing complexity of blind detection of the terminal device.

Further, the terminal device may further determine the contents indicated by the target information indication fields in the DCI according to index values of the CORESET pool indexes of the current CORESET (where different index values correspond to different TRPs), so that different TRPs may use the same information indication field in the DCI with the same format to indicate different information contents, improving flexibility of data scheduling.

It should be noted that, various implementations described in the present application and/or technical features in various implementations can be arbitrarily combined with each other without conflict, and technical solutions obtained after the combination should also fall into the protection scope of the present application.

It should also be understood that sequence numbers of the foregoing processes do not mean execution sequences in various implementations of the present application. The execution sequences of the processes should be determined according to functions and internal logics of the processes, and should not impose any limitation on the implementation processes of the implementations of the present application.

The method for downlink signal transmission according to the implementations of the present application have been described in detail above, and devices in accordance with the implementations of the present application will be described below with reference to FIG. 10 to FIG. 12. The technical features described in the method implementations are applicable to the following device implementations.

Figure 10:
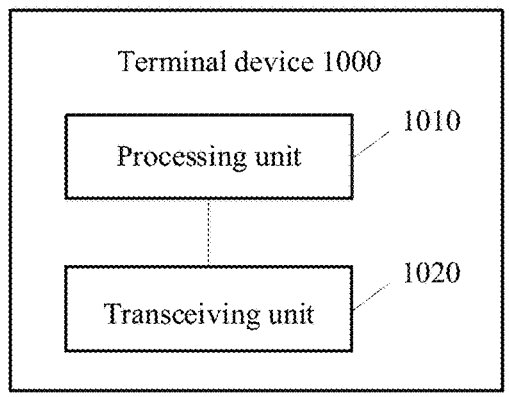
FIG. 10 is a schematic block diagram of a terminal device according to an implementation of the present application.

FIG. 10 is a schematic block diagram of a terminal device 1000 according to an implementation of the present application. As shown in FIG. 10, the terminal device 1000 includes a processing unit 1010 and a transceiving unit 1020.

The processing unit 1010 is configured to determine the number of bits of a target information indication field and/or an information content indicated by the target information indication field in downlink control information (DCI) according to configurations of CORESET pool indexes.

The transceiving unit 1020 is configured to send or receive signals scheduled by the DCI based on the number of bits of the target information indication field and/or the information content indicated by the target information indication field.

Therefore, the terminal device determines the number of bits of the target information indication field and/or the information content indicated by the target information indication field in the DCI according to the configurations of the CORESET pool indexes, such that the DCI can be detected based on the number of bits of the target information indication field and/or the indicated information content and the signals can be transmitted accordingly based on the content indicated by the DCI, to improve signal transmission performance.

Optionally, the target information indication field includes at least one of: a DMRS port indication field, a TCI indication field, an HARQ process indication field, a second transport block information indication field, a DAI indication field and a PUCCH resource indication field.

Optionally, the processing unit is specifically configured to determine the number of bits of the target information indication field and/or the information content indicated by the target information indication field according to the quantity of the configured CORESET pool indexes, wherein the quantity is greater than or equal to 0.

Optionally, when the CORESET pool indexes are not included in parameters of CORESETs configured for the terminal device, the quantity of CORESET pool indexes is 0; and/or when the CORESET pool indexes included in the parameters of the CORESET configured for the terminal device are all 0 or all 1, the quantity of CORESET pool indexes is 1; and/or when the CORESET pool indexes included in the parameters of a portion of the CORESETs configured for the terminal device are 0, and the CORESET pool indexes included in the parameters of another portion of the CORESETs configured for the terminal device are 1, the quantity of CORESET pool indexes is 2.

Optionally, the number of bits of the target information indication field when the quantity is a first value is different from the number of bits of the target information indication field when the quantity is a second value; and/or the information content indicated by the target information indication field when the quantity is the first value is different from the information content indicated by the target information indication field when the quantity is the second value.

Optionally, the target information indication field includes the DMRS port indication field, and a mapping relationship between values of the DMRS port indication field and DMRS ports when the quantity of CORESET pool indexes is the first value is different from the mapping relationship when the quantity is the second value; and/or the target information indication field includes the TCI indication field, and TCI states corresponding to values of the TCI indication field when the quantity is the first value are different from the TCI states corresponding to the values of the TCI indication field when the quantity is the second value; and/or the target information indication field includes the TCI indication field, and the TCI indication field is only used for indicating one TCI state when the quantity is the first value, and the TCI indication field may be used for indicating one or more TCI states when the quantity is the second value; and/or the target information indication field includes the HARQ process indication field, and an HARQ process indicated by the HARQ process indication field when the quantity is the first value is different from the HARQ process indicated by the HARQ process indication field when the quantity is the second value; and/or the target information indication field includes the second transport block information indication field, and the second transport block information indication field can be used for indicating whether the second transport block is enabled or disabled when the quantity is the first value, and the second transport block information indication field only indicates that the second transport block is disabled when the quantity is the second value; and/or the target information indication field includes the DAI indication field, and an index indicated by the DAI indication field may be used for transmission of PDSCHs scheduled in multiple CORESETs when the quantity is the first value, and the index indicated by the DAI indication field is only used for transmission of the PDSCHs scheduled in a CORESET where the DCI is located when the quantity is the second value; and/or the target information indication field includes the PUCCH resource indication field, and the PUCCH resource indication field is used for indicating PUCCH resources in a first PUCCH resource set when the quantity is the first value, and the PUCCH resource indication field is used for indicating PUCCH resources in a second PUCCH resource set when the quantity is the second value.

Optionally, the first value is 0, and the second value is greater than 0; or the first value is 1, and the second value is 0 or 2; or the first value is any one of 0, 1 and 2, and the second value is other one of 0, 1 and 2 than the first value.

Optionally, the DCI is DCI detected in any one of the multiple CORESETs configured for the terminal device.

Optionally, the DCI is DCI detected in a first CORESET. The processing unit is specifically configured to determine the number of bits of the target information indication field and/or the information content indicated by the target information indication field in the DCI according to configurations of a CORESET pool index of the first CORESET.

Optionally, the processing unit is specifically configured to determine the number of bits of the target information indication field and/or the information content indicated by the target information indication field according to whether the CORESET pool index is configured for the first CORESET.

Optionally, the target information indication field includes the DMRS port indication field, and a mapping relationship between values of the DMRS port indication field and DMRS ports when the CORESET pool index is configured for the first CORESET is different from the mapping relationship when the CORESET pool index is not configured for the first CORESET; and/or the target information indication field includes the TCI indication field, and TCI states corresponding to values of the TCI indication field when the CORESET pool index is configured for the first CORESET are different from the TCI states corresponding to the values of the TCI indication field when the CORESET pool index is not configured for the first CORESET; and/or the target information indication field includes the second transport block information indication field, and the second transport block information indication field is only used for indicating that the second transport block is disabled when the CORESET pool index is configured for the first CORESET, and the second transport block information indication field may be used for indicating whether the second transport block is enabled or disabled when the CORESET pool index is not configured for the first CORESET; and/or the target information indication field includes the DAI indication field, and an index indicated by the DAI indication field can only be used for transmission of PDSCHs scheduled in the first CORESET when the CORESET pool index is configured for the first CORESET, and the index indicated by the DAI indication field is used for transmission of the PDSCHs scheduled in all multiple CORESETs when the CORESET pool index is not configured for the first CORESET; and/or the target information indication field includes the PUCCH resource indication field, and the PUCCH resource indication field is used for indicating PUCCH resources in a third PUCCH resource set when the CORESET pool index is configured for the first CORESET, and the PUCCH resource indication field is used for indicating PUCCH resources in a fourth PUCCH resource set when the CORESET pool index is not configured for the first CORESET.

Optionally, the processing unit is specifically configured to determine the number of bits of the target information indication field and/or the information content indicated by the target information indication field according to the value of the CORESET pool index of the first CORESET.

Optionally, the target information indication field includes the TCI indication field, and a mapping relationship between values of the TCI indication field and TCI states when the CORESET pool index of the first CORESET is a third value is different from the mapping relationship when the CORESET pool index of the first CORESET is a fourth value; and/or the target information indication field includes the HARQ process indication field, and a HARQ process indicated by the HARQ process indication field when the CORESET pool index of the first CORESET is the third value is different from a HARQ process indicated by the HARQ process indication field when the CORESET pool index of the first CORESET is the fourth value; and/or the target information indication field includes the PUCCH resource indication field, and the PUCCH resource indication field is used for indicating PUCCH resources in a fifth PUCCH resource set when the CORESET pool index of the first CORESET is the third value, and the PUCCH resource indication field is used for indicating PUCCH resources in a sixth PUCCH resource set when the CORESET pool index of the first CORESET is the fourth value.

Optionally, the third value is 0, and the fourth value is 1.

Optionally, when the CORESET pool index of the first CORESET is the third value, the CORESET pool index of the first CORESET is the fourth value, and the CORESET pool index is not configured for the first CORESET, the numbers of bits in the target information indication fields are different from each other and/or the information contents indicated by the target information indication fields are different from each other.

Optionally, the transceiving unit is specifically configured to detect the DCI based on the number of bits of the target information indication field, and send or receive the signals scheduled by the DCI according to the indicated information content in the detected DCI.

It should be understood that the terminal device 1000 may perform corresponding operations performed by the terminal device in the method shown in FIG. 6, which will not be repeated herein for brevity.

Figure 11:
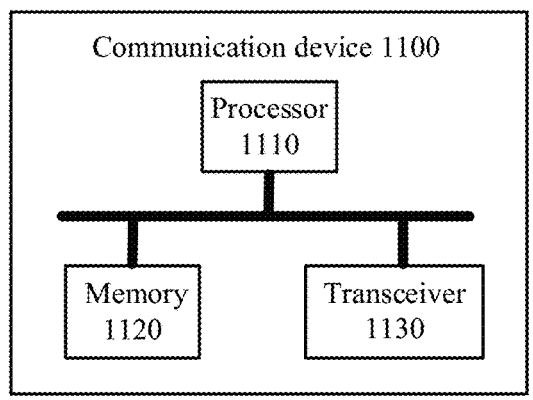
FIG. 11 is a schematic structural diagram of a communication device according to an implementation of the present application.

FIG. 11 is a schematic structural diagram of a communication device 1100 according to an implementation of the present application. The communication device 1100 shown in FIG. 11 includes a processor 1110, which may call and run a computer program from a memory to implement the methods in the implementations of the present application.

Optionally, as shown in FIG. 11, the communication device 1100 may further include a memory 1120. The processor 1110 may call and run the computer program from the memory 1120 to implement the methods in the implementations of the present application.

The memory 1120 may be a separate device independent of the processor 1110 or may be integrated in the processor 1110.

Optionally, as shown in FIG. 11, the communication device 1100 may further include a transceiver 1130. The processor 1110 may control the transceiver 1130 to communicate with other devices. Specifically, the transceiver 1130 may send information or data to other devices or receive information or data sent by other devices.

The transceiver 1130 may include a transmitter and a receiver. The transceiver 1130 may further include antennas, and the number of which may be one or more.

Optionally, the communication device 1100 may specifically be a terminal device of the implementations of the present application, and the communication device 1100 may implement the corresponding processes implemented by the terminal device in various methods of the implementations of the present application, which will not be repeated herein for brevity.

Optionally, the communication device 1100 may specifically be a network device of the implementations of the present application, and the communication device 1100 may implement the corresponding processes implemented by the network device in various methods of the implementations of the present application, which will not be repeated herein for brevity.

Figure 12:
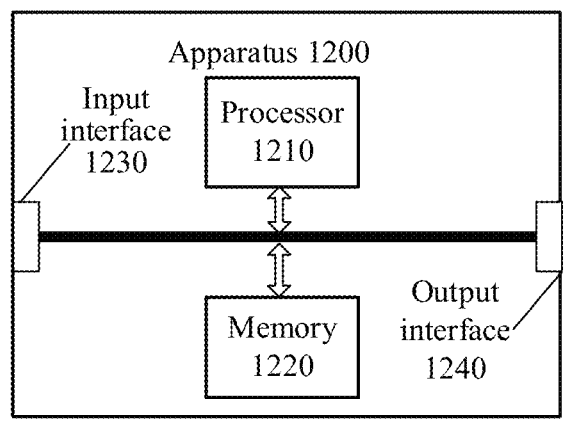
FIG. 12 is a schematic diagram of a structure of an apparatus for downlink signal transmission according to an implementation of the present application.

FIG. 12 is a schematic diagram of a structure of an apparatus for downlink signal transmission of an implementation of the present application. The apparatus 1200 shown in FIG. 12 includes a processor 1210. The processor 1210 may call and run a computer program from a memory to implement the methods in the implementations of the present application.

Optionally, as shown in FIG. 12, the apparatus 1200 may further include a memory 1220. The processor 1210 may call and run the computer program from the memory 1220 to implement the methods in the implementations of the present application.

The memory 1220 may be a separate device independent of the processor 1210 or may be integrated in the processor 1210.

Optionally, the apparatus 1200 may further include an input interface 1230. The processor 1210 may control the input interface 1230 to communicate with other devices or chips. Specifically, the processor 1210 may acquire information or data sent by other devices or chips.

Optionally, the apparatus 1200 may further include an output interface 1240. The processor 1210 may control the output interface 1240 to communicate with other devices or chips. Specifically, the processor 1210 may output information or data to other devices or chips.

Optionally, the apparatus 1200 may be applied in a network device of the implementations of the present application, and the communication device may implement the corresponding processes implemented by the network device in various methods of the implementations of the present application, which will not be repeated herein for brevity.

Optionally, the apparatus 1200 may be applied in a terminal device in the implementations of the present application, and the communication device may implement the corresponding processes implemented by the terminal device in various methods of the implementations of the present application, which will not be repeated herein for brevity.

Optionally, the apparatus 1200 may be a chip. The chip may be a system-level chip, a system chip, a chip system or a system-on-chip, etc.

The processor in the implementations of the present application may be an integrated circuit chip having a signal processing capability. In an implementation process, each of the steps of the foregoing method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, steps and logical block diagrams disclosed in the implementations of the present application. The general purpose processor may be a microprocessor, or the processor may also be any conventional processor, or the like. The steps of the methods disclosed in the implementations of the present application may be directly implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the steps of the foregoing methods in combination with its hardware.

The memory in the implementations of the present application may be a volatile memory or a non-volatile memory, or may include both a volatile memory and a non-volatile memory. The non-volatile memory may be a Read-Only Memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM).

The foregoing memory is described in an example for illustration and should not be construed as limiting. For example, the memory in the implementations of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present application is intended to include, but not be limited to, these and any other suitable type of memory.

An implementation of the present application further provides a computer-readable storage medium configured to store a computer program. Optionally, the computer-readable storage medium may be applied in a terminal device in the implementations of the present application, and the computer program causes a computer to perform the corresponding processes implemented by the terminal device in various methods of the implementations of the present application, which will not be repeated herein for brevity.

An implementation of the present application further provides a computer program product including computer program instructions. Optionally, the computer program product may be applied in a terminal device in the implementations of the present application, and the computer program instructions cause a computer to perform the corresponding processes implemented by the terminal device in various methods of the implementations of the present application, which will not be repeated herein for brevity.

An implementation of the present application further provides a computer program. Optionally, the computer program may be applied in a terminal device in the implementations of the present application, and the computer program, when running on a computer, causes the computer to perform the corresponding processes implemented by the terminal device in various methods of the implementations of the present application, which will not be repeated herein for brevity.

The terms "system" and "network" in the implementations of the present invention are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

In the implementations of the present invention, "B corresponding to (in correspondence to) A" means that B is associated with A, and B may be determined according to A. However, it should be further understood that determining B according to A does not mean that B is determined according to A only, and B may be determined according to A and/or other information.

Those of ordinary skill in the art will recognize that the exemplary elements and algorithm acts in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present application.

Those skilled in the art may clearly understand that for convenience and conciseness of description, the specific working processes of the systems, apparatuses and units described above may be described with reference to the corresponding processes in the above method implementations and will not be repeated herein.

In several implementations provided by the present invention, it should be understood that the disclosed systems, apparatuses and methods may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present application may be integrated into one processing unit, or may exist physically separately, or two or more than two units may be integrated into one unit.

The function, if achieved in a form of software functional units and sold or used as a separate product, may be stored in a computer-readable storage medium. Based on this understanding, the technical solution of the present application, in essence, or the part contributing to the prior art, or the part of the technical scheme, may be embodied in the form of a software product, which is stored in a storage medium, and includes several instructions for causing a computer device (which may be a personal computer, a server, a network device or the like) to perform all or part of the acts of the method described in various implementations of the present application. The aforementioned storage medium includes: any medium that can store program code, such as a USB flash drive, a removable hard disk, a read-only memory (ROM), a random access memory (RAM), a magnetic disk, or an optical disk, which are capable of storing program codes What are described above are merely specific implementations of the present application, but the protection scope of the present application is not limited thereto. Any variation or substitution that may be easily conceived by a person familiar with the art within the technical scope disclosed by the present application shall be included within the protection scope of the present application. Therefore, the protection scope of the present application shall be subject to the protection scope of the claims.

What we claim is:

1. A method for downlink signal transmission, comprising:
    determining, by a terminal device, a number of bits of a target information indication field in downlink control information (DCI) and/or an information content indicated by the target information indication field according to configurations of a Control Resource Set (CORESET) pool index;
    detecting, by the terminal device, the DCI based on the number of bits of the target information indication field in the DCI and/or the information content indicated by the target information indication field; and
    sending or receiving, by the terminal device, signals scheduled by the DCI according to the DCI; wherein determining, by the terminal device, the number of bits of the target information indication field in the DCI and/or the information content indicated by the target information indication field according to the configurations of the CORESET pool index comprises:
    determining, by the terminal device, the number of bits of the target information indication field and/or the information content indicated by the target information indication field according to a quantity of the configured CORESET pool indexes, wherein the quantity is greater than or equal to 0; wherein the number of bits of the target information indication field when the quantity is a first value is different from the number of bits of the target information indication field when the quantity is a second value; and/or
    the information content indicated by the target information indication field when the quantity is the first value is different from the information content indicated by the target information indication field when the quantity is the second value.

2. The method of claim 1, wherein the target information indication field comprises at least one of:
a demodulation reference signal (DMRS) port indication field, a transmission configuration indicator (TCI) indication field, a hybrid automatic repeat reQuest (HARQ) process indication field, a second transport block information indication field, a downlink assignment index (DAI) indication field and a physical uplink control channel (PUCCH) resource indication field.

3. The method of claim 1, wherein
when the CORESET pool index is not comprised in parameters of any CORESET configured for the terminal device, the quantity of the CORESET pool index is 0; and/or
when all the CORESET pool indexes comprised in the parameters of CORESETs configured for the terminal device are equal to 0 or all the CORESET pool indexes comprised in the parameters of CORESETs configured for the terminal device are equal to 1, the quantity of the CORESET pool indexes is 1; and/or
when the CORESET pool indexes comprised in the parameters of a portion of the CORESETs configured for the terminal device are equal to 0, and the CORESET pool indexes comprised in the parameters of another portion of the CORESETs configured for the terminal device are equal to 1, the quantity of the CORESET pool indexes is 2.

4. The method of claim 1, wherein:
the target information indication field comprises the DMRS port indication field, and a mapping relationship between values of the DMRS port indication field and DMRS ports when the quantity of the CORESET pool indexes is the first value is different from the mapping relationship when the quantity is the second value; and/or
the target information indication field comprises the TCI indication field, and TCI states corresponding to values of the TCI indication field when the quantity is the first value are different from the TCI states corresponding to the values of the TCI indication field when the quantity is the second value; and/or
the target information indication field comprises the TCI indication field, and the TCI indication field is only used for indicating one TCI state when the quantity is the first value, and the TCI indication field is capable of being used for indicating one or more TCI states when the quantity is the second value; and/or
the target information indication field comprises the HARQ process indication field, and an HARQ process indicated by the HARQ process indication field when the quantity is the first value is different from the HARQ process indicated by the HARQ process indication field when the quantity is the second value; and/or
the target information indication field comprises the second transport block information indication field, and the second transport block information indication field is capable of being used for indicating whether the second transport block is enabled or disabled when the quantity is the first value, and the second transport block information indication field only indicates that the second transport block is disabled when the quantity is the second value; and/or
the target information indication field comprises the DAI indication field, and an index indicated by the DAI indication field is capable of being used for transmission of PDSCHs scheduled in a plurality of CORESETs when the quantity is the first value, and the index indicated by the DAI indication field is only used for transmission of the PDSCHs scheduled in a CORESET where the DCI is located when the quantity is the second value; and/or
the target information indication field comprises the PUCCH resource indication field, and the PUCCH resource indication field is used for indicating PUCCH resources in a first PUCCH resource set when the quantity is the first value, and the PUCCH resource indication field is used for indicating PUCCH resources in a second PUCCH resource set when the quantity is the second value.

5. The method of claim 1, wherein:
the first value is 0, and the second value is greater than 0; or
the first value is 1, and the second value is 0 or 2; or
the first value is any one of 0, 1 and 2, and the second value is other values among 0, 1 and 2 than the first value; or
the first value is 2, and the second value is 0 and 1.

6. The method of claim 1, wherein:
the DCI is DCI detected in any one of the plurality of CORESETs configured for the terminal device.

7. A terminal device, comprising a memory and a processor, wherein the processor is configured to execute instructions stored in the memory to perform following operations:
determine a number of bits of a target information indication field in downlink control information (DCI) and/or an information content indicated by the target information indication field according to configurations of Control Resource Set (CORESET) pool index;
detect the DCI based on the number of bits of the target information indication field in the DCI and/or the information content indicated by the target information indication field; and
send or receive signals scheduled by the DCI according to the DCI; wherein the processor is further configured to execute instructions stored in the memory to perform following operation:
determine the number of bits of the target information indication field and/or the information content indicated by the target information indication field according to a quantity of configured CORESET pool indexes, wherein the quantity is greater than or equal to 0;
when the CORESET pool index is not comprised in parameters of any CORESET configured for the terminal device, the quantity of the CORESET pool indexes is 0; and/or
when all the CORESET pool indexes comprised in the parameters of the CORESETs configured for the terminal device are 0 or when all the CORESET pool indexes comprised in the parameters of the CORESETs configured for the terminal device are 1, the quantity of the CORESET pool indexes is 1; and/or
when the CORESET pool indexes comprised in the parameters of a portion of the CORESETs configured for the terminal device are 0, and the CORESET pool indexes comprised in the parameters of another portion of the CORESETs configured for the terminal device are 1, the quantity of CORESET pool indexes is 2;
wherein:
the number of bits of the target information indication field when the quantity is a first value is different from the number of bits of the target information indication field when the quantity is a second value; and/or the information content indicated by the target information indication field when the quantity is the first value is different from the information content indicated by the target information indication field when the quantity is the second value.

8. The terminal device of claim 7, wherein the target information indication field comprises at least one of:
a demodulation reference signal (DMRS) port indication field, a transmission configuration indicator (TCI) indication field, a hybrid automatic repeat reQuest (HARQ) process indication field, a second transport block information indication field, a downlink assignment index (DAI) indication field and a physical uplink control channel (PUCCH) resource indication field.

9. The terminal device according to claim 7, wherein:
the target information indication field comprises the DMRS port indication field, and a mapping relationship between values of the DMRS port indication field and DMRS ports when the quantity of the CORESET pool indexes is the first value is different from the mapping relationship when the quantity is the second value; and/or
the target information indication field comprises the TCI indication field, and TCI states corresponding to values of the TCI indication field when the quantity is the first value are different from the TCI states corresponding to the values of the TCI indication field when the quantity is the second value; and/or
the target information indication field comprises the TCI indication field, and the TCI indication field is only used for indicating one TCI state when the quantity is the first value, and the TCI indication field is capable of being used for indicating one or more TCI states when the quantity is the second value; and/or
the target information indication field comprises the HARQ process indication field, and an HARQ process indicated by the HARQ process indication field when the quantity is the first value is different from the HARQ process indicated by the HARQ process indication field when the quantity is the second value; and/or
the target information indication field comprises the second transport block information indication field, and the second transport block information indication field is capable of being used for indicating whether the second transport block is enabled or disabled when the quantity is the first value, and the second transport block information indication field only indicates that the second transport block is disabled when the quantity is the second value; and/or
the target information indication field comprises the DAI indication field, and an index indicated by the DAI indication field is capable of being used for transmission of PDSCHs scheduled in a plurality of CORESETs when the quantity is the first value, and the index indicated by the DAI indication field is only used for transmission of the PDSCHs scheduled in a CORESET where the DCI is located when the quantity is the second value; and/or
the target information indication field comprises the PUCCH resource indication field, and the PUCCH resource indication field is used for indicating PUCCH resources in a first PUCCH resource set when the quantity is the first value, and the PUCCH resource indication field is used for indicating PUCCH resources in a second PUCCH resource set when the quantity is the second value.

10. The terminal device of claim 7, wherein:
the first value is 0, and the second value is greater than 0; or
the first value is 1, and the second value is 0 or 2; or
the first value is any one of 0, 1 and 2, and the second value is another one of 0, 1 and 2 than the first value; or
the first value is 2, and the second value is 0 and 1.

11. The terminal device of claim 7, wherein the DCI is DCI detected in any of the plurality of CORESETs configured for the terminal device.

12. A chip, comprising a processor and a memory, wherein the memory is configured to store a computer program, and the processor is configured to call and run the computer program stored in the memory to perform the method according to claim 1.

* * * * *